S. C. LINDSAY.
LOCK NUT.
APPLICATION FILED MAY 8, 1914.
1,134,393.
Patented Apr. 6, 1915.
Fig. 1.
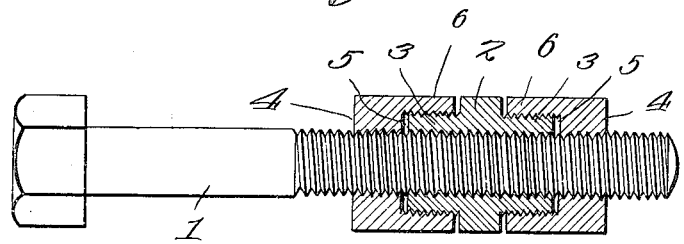
Fig. 2.
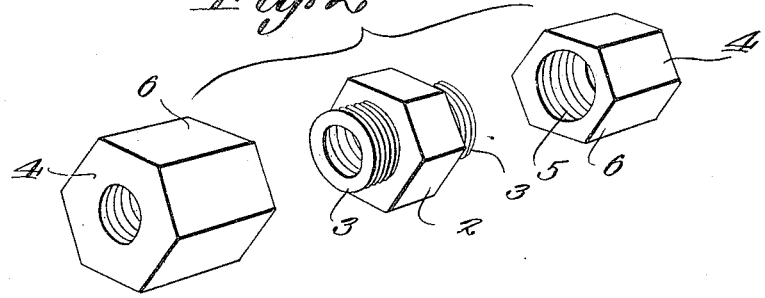
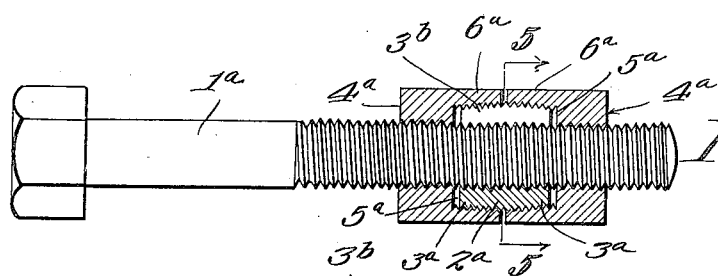
Fig. 3.
Fig. 4.
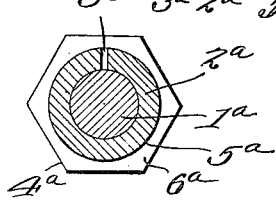
Solomon C. Lindsay
Inventor,
by C. A. Snow & Co.
Attorneys
Witnesses

UNITED STATES PATENT OFFICE.

SOLOMON C. LINDSAY, OF GREENSBURG, PENNSYLVANIA.

LOCK-NUT.

1,134,393.          Specification of Letters Patent.          Patented Apr. 6, 1915.

Application filed May 8, 1914.   Serial No. 837,228.

*To all whom it may concern:*

Be it known that I, SOLOMON C. LINDSAY, a citizen of the United States, residing at Greensburg, in the county of Westmoreland and State of Pennsylvania, have invented a new and useful Lock-Nut, of which the following is a specification.

The present invention appertains to lock nuts, and aims to provide a novel or unique device of that character, which is adapted to be effectively locked or bound at any desired point upon a bolt, threaded rod, or the like.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 1 is a longitudinal section of the device as applied upon a bolt. Fig. 2 is a perspective view of the main and locking nuts separated. Fig. 3 is a view similar to Fig. 1, illustrating a variation. Fig. 4 is a cross section taken on the line 5—5 of Fig. 3.

Referring specifically to Figs. 1 and 2, the numeral 1 designates a bolt, threaded rod, or the like, and the numeral 2 designates the main nut, which is of hexagonal or polygonal contour, and which is provided with portions or bosses 3 projecting from both faces thereof. The nut 2 is interiorly threaded, from the free end of one portion or boss 3, to the free end of the other boss or portion 3, the screw thread corresponding with the thread of the bolt or rod 1, and the extensions or bosses 3 are also exteriorly threaded. The exterior threads of the bosses 3 are of a different pitch than the pitch of the interior thread of the nut 2 and the thread of the bolt 1.

A pair of locking or binding nuts 4 are provided, each of the same having a socket or recess 5 at one end of its threaded bore, or in one face, and providing a rim or flange 6 which is interiorly threaded. The interior thread of the recess or counterbore 5, of each nut 4, corresponds in pitch, with the pitch of the external threads of the bosses 3. The main threads of the nuts 4 are of a pitch equal to the pitch of the thread of the bolt or rod 1.

In applying the nuts 2 and 4 upon the bolt or rod 1, the rims or flanges 6 of the locking nuts 4 are first threaded upon the bosses 3 of the main nut 2, the nuts 4 being hexagonal or polygonal similar to the nut 2, whereby the nuts will be of uniform contour. The rims or flanges 6 of the nuts 4 are preferably equal in length to the bosses 3, and when the nuts are at normal position, they are spaced slightly apart, as seen in Fig. 1. When the nuts are thus arranged, the interior or main threads thereof are so arranged, that the nuts may be readily threaded simultaneously, or as a unit, upon the bolt or rod 1. Then, when the nuts have been threaded to the particular position where they are to be locked, the locking nuts 4 are rotated with respect to the main nut 2, which will cause a double binding action between the bolt or rod 1 and the main nut 2, due to the difference in pitch of the screw threads between the nuts and bolt, and between the nuts 2 and 4. A slight turn of either or both of the nuts 4 with respect to the main nut 2, will result in the effective binding or locking of the nuts upon the bolt, to prevent the accidental movement of the nuts.

To readjust, or unscrew the nuts, the nuts 4 are threaded back to their normal positions with respect to the nut 2, which will enable the nuts to be simultaneously unscrewed or rotated. When the nuts 2 and 4 are at normal position with respect to each other, in order that they may be threaded simultaneously upon the bolt, the sides of the said nuts are flush, in order that all of the nuts may be grasped by a wrench, or other implement.

In the variation illustrated in Figs. 3 and 4, the main nut $2^a$ which is threaded upon the bolt $1^a$, is in the form of a sleeve, and has its end portions tapered from the center or intermediate portion of the nut $2^a$, to the extremities, as at $3^a$, and one side of the nut $2^a$ is provided with a longitudinal slot or slit $3^b$. The binding nuts $4^a$ are provided with the tapered sockets or counter bores $5^a$, providing the rims or lips $6^a$ which are threaded over the end portions $3^a$ of the main nut $2^a$, the pitch of the exterior threads of the nut $2^a$ and the flanges or rims $6^a$, being different than the pitch of the thread of the bolt and the interior threads of the nuts. This variation operates somewhat the same as the form illustrated in Fig. 1, with the exception that the main nut must be rotated with the binding nuts 4ª, and when the binding nuts are threaded toward each other, the tapered sockets 5ª in working onto the ends of the nut 2ª, will compress the nut 2ª tightly upon the bolt, as well as providing the double binding action. Thus, a triple locking action is provided, and furthermore, it is only with great care that the nut may be unscrewed. This reduces the tendency for the nuts to become loosened, to a minimum, and also guards against the releasing of the nuts by malicious or unauthorized persons.

From the foregoing, the advantages and capabilities of the present invention will be obvious to those versed in the art without further comment being necessary, it being mentioned, however, that the present device may not only be employed as a lock nut, but may be employed in other capacities, for holding or binding an element in place upon a member which it threadedly engages. Thus, the members 2 and 2ª, may be taken to represent any suitable member which is to be locked upon the corresponding bolt, rod or other element.

Having thus described the invention, what is claimed as new is:—

In combination, a threaded element, a second element threaded thereon and having oppositely projecting exteriorly-threaded portions, and a pair of binding elements threaded upon the first mentioned element and having counter bores threaded over the said portions, the interengaging screw threads of the said portions and counter bores being of a different pitch than the interengaging threads of the first mentioned element and the second and third mentioned elements.

In testimony that I claim the foregoing as my own, I have hereto affixed my signature in the presence of two witnesses.

SOLOMON C. LINDSAY.

Witnesses:
FRANK SCURICH,
JOHN ZANQUITH.

Copies of this patent may be obtained for five cents each, by addressing the "Commissioner of Patents, Washington, D. C."